April 20, 1926. 1,581,364

F. SUNDAY

CONTROL SYSTEM FOR CAR HEATING

Filed May 23, 1924    2 Sheets-Sheet 2

Inventor

Frank Sunday,

By

Attorneys

Patented Apr. 20, 1926.

1,581,364

UNITED STATES PATENT OFFICE.

FRANK SUNDAY, OF DETROIT, MICHIGAN, ASSIGNOR OF ONE-HALF TO CLAUDE M. ROSA, OF DETROIT, MICHIGAN.

CONTROL SYSTEM FOR CAR HEATING.

Application filed May 23, 1924. Serial No. 715,402.

*To all whom it may concern:*

Be it known that I, FRANK SUNDAY, a citizen of the United States, residing at Detroit, in the county of Wayne and State of Michigan, have invented certain new and useful Improvements in Control Systems for Car Heating, of which the following is a specification, reference being had therein to the accompanying drawings.

This invention has reference to car heating systems wherein the steam or similar valve effecting the admission and shutting off of heating fluid to and from radiator coils, or other heating equipment within a car, is controlled electrically and preferably automatically through the medium of a thermostat. Many devices more or less successful have been employed from time to time for such purposes, using relayed currents which energized suitable motors for the opening and closing of a steam or other valve, but in such devices certain disadvantages have been apparent.

It very often occurs with steam or similar valves, that if left in open or closed position for a length of time, they have an inclination to stick and thereby resist the effort to move them to such an extent that an excessive electrical strain is put upon the electric equipment or such equipment is taxed beyond its power to operate the valve. Thus, the automatic regulation of heat within a car so equipped is unreliable and the temperature within such a car is permitted to rise or fall to a much greater extent than the setting of the thermostatic control calls for.

Furthermore, in such devices it often occurs that by reason of their construction, or by reason of the electrical strain caused by the sticking of the valves referred to, the thermostat is subjected to a current flow of heavy amperage which results in the burning up of the mercury make and break contact, where such construction is employed, or causes arcing at the contact points where the making and breaking of the operating circuit occurs with consequent destructive effect which serious affects the working and reliability of the installation.

The objects of this invention are, therefore, to provide for the alleviation of such disadvantages by the arrangement of means adapted to overcome the inertia of a valve which has a tendency to stick, and further to relieve the thermostat from destructive high amperage operating currents.

Still further objects are to provide for double impulses in each operating direction to the valve operating motor and to make use of momentum in the valve actuator of the said motor in overcoming sticking of the valve; and still further objects subsidiary to or resulting from the aforesaid objects or from the construction or operation of the invention as it may be carried into effect will become apparent as the said invention is hereinafter further disclosed.

In carrying the said invention into effect, I may provide a system of circuits including a thermostatically controlled relay circuit, a relay controlled circuit adapted to operate a two-way switch, and circuits associated with each of the ways of said switch effecting the operation of a motor or motors in one or other direction to open or close a valve, each of the contacts of said two-way switch being adapted to double closing of a circuit therethrough whereby two consecutive impulses are applied to said motor through one or other of said circuits. I prefer to give greater motion to the actuator forming part of said motor than to the actuated lever of said valve, such excess motion being ensured by said second impulse whereby upon the first impulse of said motor in the opposite direction momentum in the actuator may be attained prior to its active engagement with the valve operating lever. To still further attain and secure efficiency in the carrying out of such an arrangement I may employ in combination therewith, an electrically and mechanically controlled two-way switch of a special type. All of which is more particularly described and ascertained hereinafter, by way of example, having reference to the accompanying drawings, in which Figure 1 is a diagrammatic illustration of said invention as embodied in a car heating system;

Similar characters of reference indicate similar parts in the several figures of the drawings.

Figure 1:
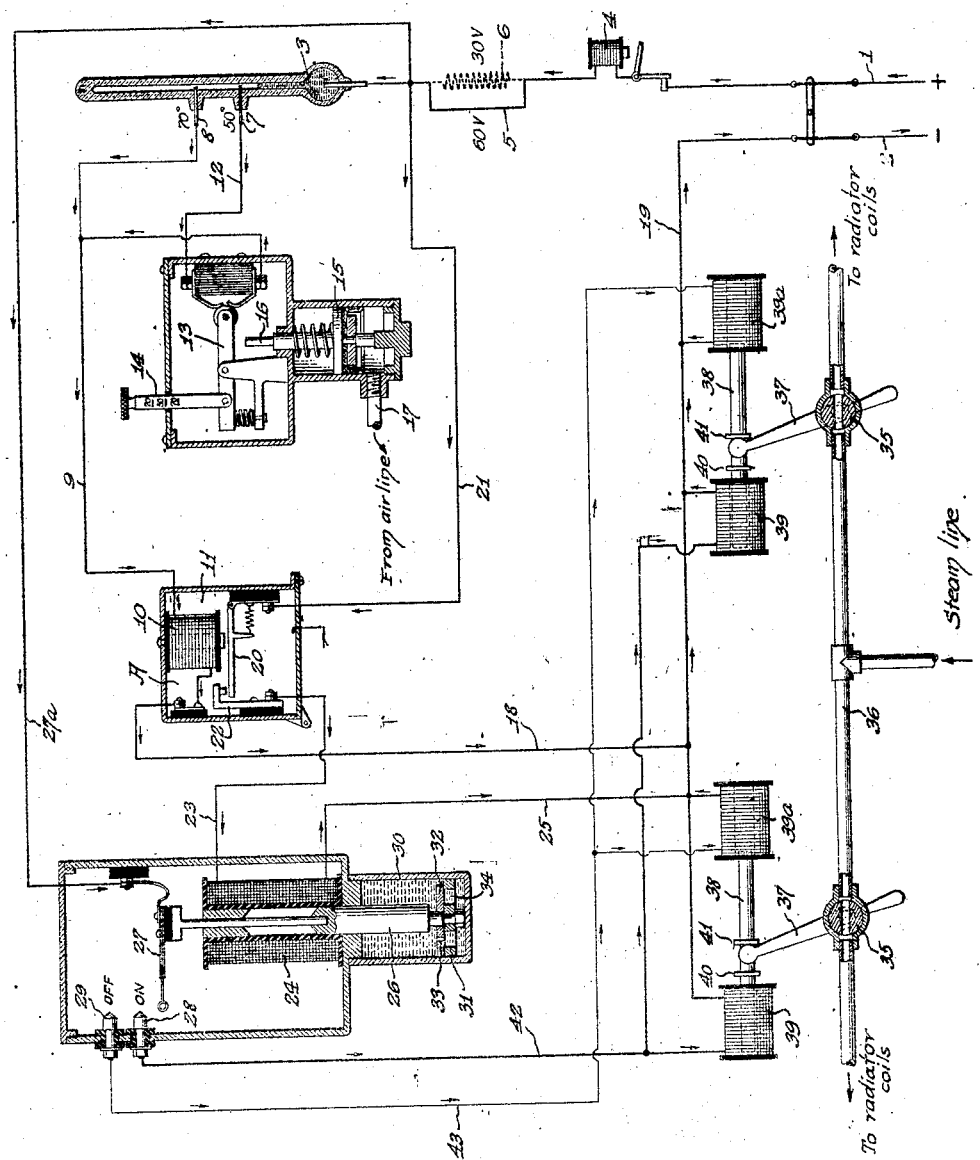

1 and 2 indicate wires connected with a source of electrical energy, the wire 1 entering the base of a variable mercury thermostat 3, 4 being an overload contact breaker and 6 a resistance which may be shorted by a bridge 5 when the current supply does not call for a resistance as is well understood in the art to which this invention appertains.

The thermostat 3 includes contact points 7 and 8 adapted to be closed by mercury at relative temperatures of say, fifty degrees and seventy degrees of heat in the car to which the system is applied, according to the positioning of the said points, the point 8 being connected by a wire 9 to the coil 10 of a relay 11 and the contact 7 connected by wiring 12 to the said wire 9 through the medium of a selector switch 13 by means of which a circuit through the wire 12 may be closed or opened.

The particular mechanism of the said switch 13 does not form a part of this invention and is well known in the art so that it need not now be more particularly described herein except to say that the plunger 14 may be manually depressed to break a circuit through the wire 12 to render the device inoperative at temperatures below seventy degrees or similar operation of the said switch may be effected by the lifting of the piston 15 and striker 16 against the switch 13 by virtue of air pressure in the line 17 when the cars in which the apparatus is used are in service.

Figure 3:
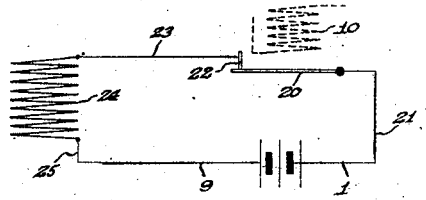
Figure 3 is a similar diagram of the relay controlled valve timing switch circuit.

18 and 19 represent the return wires from the coil 10 of the relay 11 so it will be seen that upon the mercury making contact with the terminal 7, if the switch 13 be in the closed position illustrated, the relay will be excited lifting the armature 20 thereof and closing the circuit shown in Figure 3 wherein the current passes through the wire 21, armature 20, contact 22, wire 23, solenoid coil 24 and return wiring 25 and 19. This in turn actuates the solenoid core 26 at the upper end of which is mounted a switch comprising a trip member 27 connected to the wire 27ª, which trip member is adapted to pass consecutively over contact points 28 and 29, the spring nature of said trip member causing it to break contact with the said points very rapidly as it passes thereover.

In order to limit the speed at which the said trip member passes from one to the other of the said contact points and to insure an appreciable space of time between the contact with one and then the other, or the points, a dash pot 30 is shown at the lower end of the solenoid core, the said core being provided with a plunger 31 and a valve 32, which valve has a small leakage orifice 33 therein to permit the slow upward movement of the said core when actuated by the exciting of the solenoid coil 24. A plunger 31 with larger orifices 34 therein permits the gravital descent of the core when the circuit through the coil 24 is broken. Thus it will be seen that the trip member 26 is capable of a comparatively slow upward and downward movement when the solenoid circuit is closed or opened respectively.

35 are steam valves situated in the steam line 36 and provided with operating levers 37 associated at their outer ends with valve lever actuators 38 each of which form the working parts of valve operating motors comprising solenoid coils 39 and 39ª at opposite ends of said actuators 38 and of which the said actuators are the cores.

Figure 4:
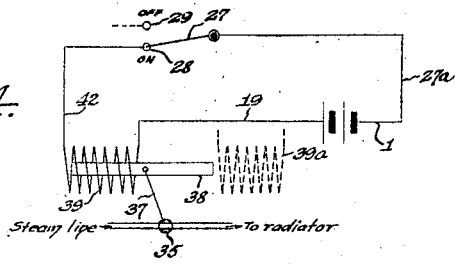
Figure 4 is a similar diagram of the valve opening circuit.
Figure 5:
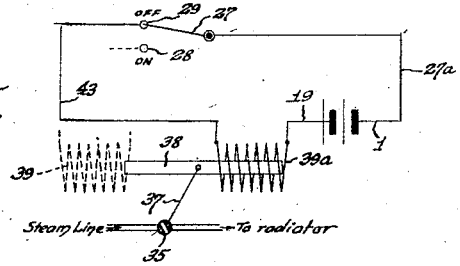
Figure 5 is a similar diagram of the valve closing circuit.

These actuators 38 are provided with spaced abutments 40 and 41 situated on either side of the outer ends of the levers 37 in such relation thereto that there is a decided play of the ends of the said levers between the abutments 40 and 41. When the circuit shown in Figure 3 is closed through the solenoid core 24 the trip member 27 comes into contact with the point 28 closing the circuit (Figure 4) through wires 42, coil 39 and return wire 19 causing the actuator or cores 38 to be moved in the direction of the coils 39 thereby bringing the abutments 40 to their position furthest removed from the end of the valve lever 37, and, as the trip lever continues to ascend, the trip member breaks contact with the point 28 following which contact is established with the point 29 thereby closing the circuit shown in Figure 5 through the wire 43, coils 39ª and return wire 19 and resulting in the movement of the cores 38 in the opposite or valve-closing direction.

It will be apparent that due to the immediately preceding closing of the circuit (Figure 4), the abutments 40 are in such position that some little movement of the core 38 is permitted after closing of the circuit, (Figure 5), before the said abutments 40 strike the levers 37 and thus sufficient momentum in the said cores is secured to effectively overcome any sticking of the valves which might otherwise interfere with their operation. The double impulse described ensures the bringing of the abutments to a fully spaced, preoperative position in case the vibration of a car has caused any shifting of the valve after the operation in one or other direction.

As long as the circuit (Figure 2) is maintained, that is to say, as long as the mercury is in contact with the point 8 of the thermostat, or in contact with the point 7 when the switch 13 is closed, the trip member 27 will remain raised above and out of contact with the contact point 29 and the valves 35 will remain closed (to which position they have been moved by the preceding contact of the trip member with the said point 29), and upon the breaking of the said circuit and the consequent breaking of the solenoid circuit (Figure 3), either by the dropping of the mercury below the point 8 when the switch 13 is open or below the point 7 when the said switch is closed, the core 26 will fall bringing the said trip member into contact with the point 29 for the second time and thereby moving or tending to move the said cores 38 again into their "off" position, and thus ensuring the required spacing of the abutments 41 from the valve levers 37 and consequent required momentum of the said cores 38 to overcome sticking of the valve, if such has taken place, this preparatory action taking place prior to the engagement of the said trip member in its continued downward movement with the contact point 28 and the consequent impelling of the cores 38 to their "on" position which is that shown in the said Figure 1.

Figure 2:
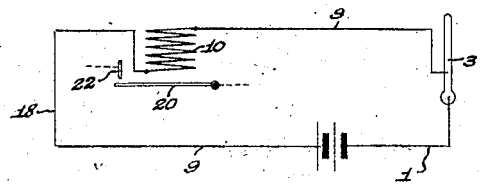
Figure 2 is a symbolic diagram of the thermostatically controlled circuit.

It will be seen that when the trip member 27 is in either its lowermost or uppermost position, the valves are turned "on" or "off" respectively, and in these positions no current is being transmitted through the coils 39 or 39ª, so that upon the breaking of the circuit, Figure 2, through the thermostat, no heavy amperage arcs will be caused and liability of the thermostat to be burned is minimized.

It will also be apparent that, by the use of lost motion in the cores 38 to provide momentum for the purpose of overcoming sticking and inertia of the valves 35, another hitherto objectionable feature of electrically controlled heating system is reduced to a minimum.

An arrangement such as that suggested may be very simply constructed and of very positive operation, there being but few parts, none of which are liable to easily get out of order and all of which lend themselves to ready replacement if found necessary or desirable.

This invention may be developed within the scope of the following claims without departing from the essential features of the said invention and it is desired that the specification and claims be read as being merely illustrative and not in a limiting sense except as necessitated by the prior art.

What I claim is:—

1. In a car heating system, a valve, a valve lever, and an electrically operated lever actuator having a greater motion than said lever whereby momentum in said actuator is attained prior to actuation of said lever, and means ensuring the electrical resetting of said lever in a position ensuring such momentum in the event of said lever having moved prior to its valve closing or opening operation.

2. A car heating system according to claim 1, wherein said valve operating means is controlled by, an automatic controlling switch, a valve opening contact, and a valve closing contact, said switch being adapted to strike each contact twice before engaging with the other of said contacts.

3. A car heating system according to claim 1, wherein said lever actuator is in the form of a pair of electrically operated opening and closing means and a thermostatically controlled switch alternately closing two circuits through said opening means and two circuits through said closing means whereby each of said means receives two successive impulses in one direction, the second of which ensures the proper positioning of said lever so that its momentum will be effective upon its receiving an impulse in an opposite direction.

4. In a car heating system of the type described, in claim 1, a pair of electrically operated opening and closing means therefor, a thermostatically controlled switch semi-alternately closing two circuits through said opening means and two circuits through said closing means whereby each of said means receives two successive impulses, said switch having reciprocating movement and adapted to electric operation in one direction only, and damping means timing the interval between such successive impulses.

In testimony whereof I affix my signature.

FRANK SUNDAY.